United States Patent [19]
Hirsch

[11] 3,733,735
[45] May 22, 1973

[54] ANIMAL TRAP
[76] Inventor: Clifford Burton Hirsch, Wukupumu Road, Woodbury, Conn. 06798
[22] Filed: Jan. 19, 1971
[21] Appl. No.: 107,687

[52] U.S. Cl. ............................................. 43/61
[51] Int. Cl. ........................................ A01m 23/18
[58] Field of Search ....................... 43/61, 62, 63, 81

[56] References Cited
UNITED STATES PATENTS

| 1,033,761 | 7/1912 | Kampfe | 43/61 |
| 3,177,608 | 4/1965 | Lindelow | 43/61 |
| 1,714,068 | 5/1929 | Askin | 43/81 |
| 2,434,031 | 1/1948 | Adams | 43/61 |

FOREIGN PATENTS OR APPLICATIONS 2,200   0/1899   Great Britain .......................... 43/81

Primary Examiner—Hugh R. Chamblee
Attorney—William A. Drucker

[57] ABSTRACT

An animal trap for vermin has a container with an end wall containing an opening. A spring closed door within the container seals the opening when bait, fixed behind the door, is attacked. The door may be held open by link members connected between the end wall and the door, the link members being joined by a hard bait so that the devouring of the bait releases the link members and the door springs closed.

7 Claims, 6 Drawing Figures

PATENTED MAY 22 1973　　3,733,735

INVENTOR:
CLIFFORD BURTON HIRSCH

ANIMAL TRAP

BACKGROUND OF THE INVENTION

While effective conventional mouse and rat traps are available to catch and kill vermin, these traps leave exposed dead carcasses which must be removed with attendant emotional distress or left to putrefy causing even greater problems. In addition, pets and children may be injured by conventional traps or poisons. The vermin trap of this invention overcomes these problems.

SUMMARY OF THE INVENTION

An animal trap for vermin, such as rats and mice, has a container which may be formed from a conventional tin can, bottle or the like. Whatever the material of the container, it must resist the teeth of a trapped animal. The container has an end wall, which may be a lid or cover, containing an opening. Within the container, a spring closed door is connected to the end wall to cover the end wall when released.

A preferred trigger mechanism consists of two link members held together by a piece of bait, the link members being connected to the door and the end wall, or a forward extension of the end wall, to hold the door open. The bait should be disposed behind the door so the rodent faces the opening when attacking the bait to release the link members and allow the door to spring closed. This ensures that the rodents tail will not hang from the opening and prevent the full closing of the door. If a seal or gasket is provided around the opening, the trap may be discarded at any time as the animal is sealed therein and smell will not come from the container. Thus this invention provides a sanitary trap which may be left in place in grain storage areas without damage to food products. It also provides a safe, inexpensive and disposable mouse or rat trap for home use which cannot be sprung by pets or children, which is sanitary, and which does not disturb the housewife.

Further, all the elements of the trap may be fixed to the lid of a conventional tin can or other container. This enables conventional can forming and sealing equipment to be used in the manufacture of the trap so that it is more easily made at low cost.

DESCRIPTION OF THE PREFERRED EMBODIMENT

Figure 1:
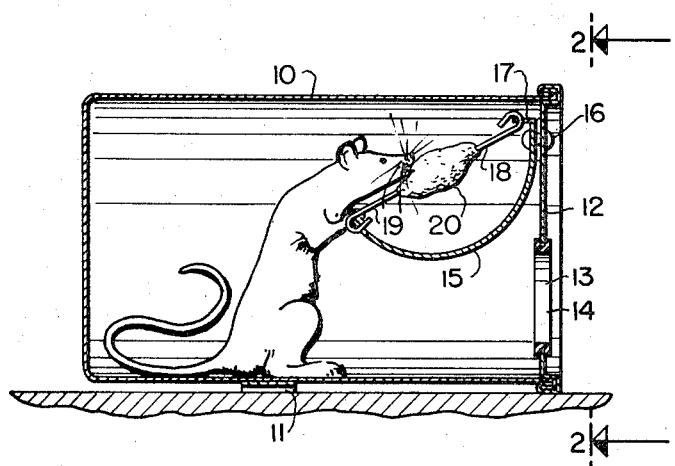
FIG. 1 is a longitudinal, vertical section through a set trap according to this invention showing a rodent therein attacking bait.
Figure 2:
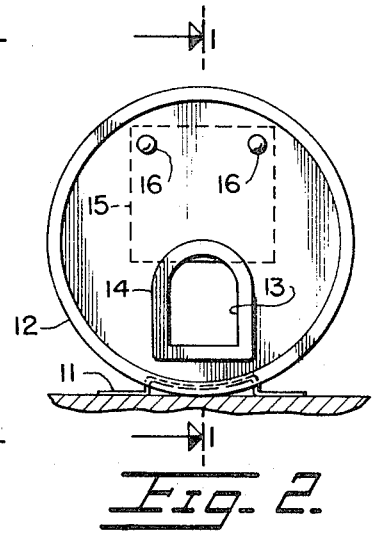
FIG. 2 is a front view of the trap of FIG. 1.
Figure 4:
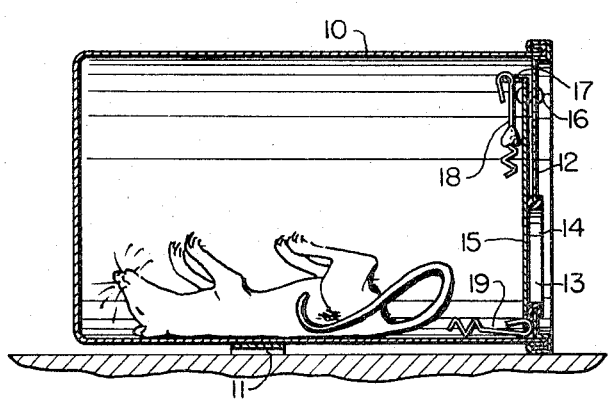
FIG. 4 is a longitudinal, vertical section through a sprung trap showing a dead rodent sealed therein.

As shown in FIGS. 1-4, the trap of this invention has a container 10 which may be a steel or aluminum can or the like. Container 10 has a support bracket or legs 11 spot welded or otherwise fixed to it to hold it in an upright position. An end wall 12 is fixed over container 10 in any conventional manner. Wall 12 contains opening 13 in a lower portion to admit an animal to be trapped. Opening 13 has a gasket 14 of soft material, such as plastic or rubber, fixed about its edge.

A door 15 of thin spring metal is fixed by rivets 16 to wall 12 above and behind opening 13. Door 15 may be fixed by one rivet 16, it may be spot welded in place, or it may be otherwise secured. The upper edge 17 of door 15 is bent inward above rivets 16 and perforated to form an extension of wall 12 to secure one end of link member 18 which may be of flat wire or the like. Another link member 19 is attached to the lower edge of door 15. The link members 18 and 19 are joined by a solid morsel of bait 20 to hold door 15 flexed in an open position.

Figure 3:
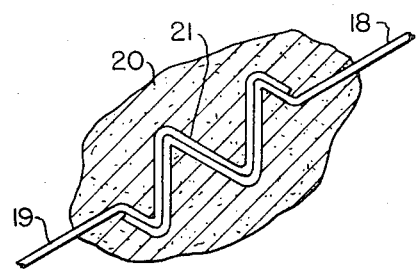
FIG. 3 is a section through an enlarged trigger mechanism showing broken away ends of link members joined by bait.

As shown in FIG. 3, the link members 18 and 19 may be formed with interlocking zigzag bends 21 and 22. The link members are held together by a hard bait 20 formed from a vinyl acetate cement bonding food particles. For example, bait 20 may be 25 per cent cement and 75 per cent food particles of grain. Fat and other attractive materials and odors may be added to the bait or as a lure inside the trap. Many food materials may be used.

If desired, the link members 18 and 19 may be formed as integral, bent extensions of door 15. Link members 18 and 19 may also be made from wire, bait impregnated string or other material held in bait 20.

Figure 5:
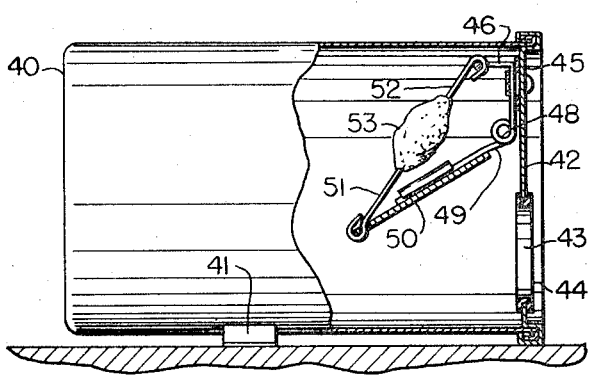
FIG. 5 is a side view of a modification of the trap with a portion broken away in vertical section showing construction of a spring closed door.
Figure 6:
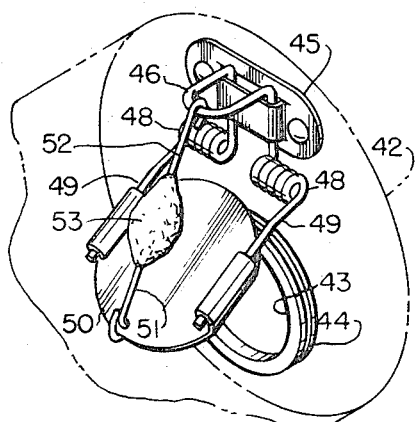
FIG. 6 is a perspective view of the spring door and trigger mechanism of FIG. 5 as seen from the inner side of the end wall, the end wall and the container being shown in phantom lines.

FIGS. 5 and 6 show a modification of this invention in which a container 40 has legs 41 and an end wall 42. Opening 43 in wall 42 is lined with a gasket 44. Bracket 45 fixed to wall 42 has a loop 46 of spring 47 clamped thereto. Two coils 48 of spring 47 have arms 49 extend therefrom to be fixed to the door 50. Link members 51 and 52 are hooked between door 50 and loop 46 joined by bait 53 to hold door 50 open as shown in a set trap. This embodiment of the invention functions in the same manner as the first embodiment already described.

A major advantage of this invention is that it may be left for an indefinite period before and after trapping a mouse or rat. Naturally, larger traps are required for rats than for mice. Further, this trap cannot harm children or pets. The position of the door and the bait ensures that a rodent's tail will not catch in a closing door to enable it to claw to freedom or prevent the door from sealing the container. Further, the entire mechanism may be fixed to one wall or cover of a can so that conventional lid fixing and sealing devices may be used to manufacture this trap at a very low cost.

While this invention has been described in the best forms known, it will nevertheless be understood that these are purely exemplary and that modifications may be made without departing from the spirit of the invention.

What is claimed is:

1. An animal trap for vermin comprising, in combination, a fluid tight container, bait inside said container, a wall of said container having an opening for the entrance of vermin therethrough, a spring closed door of resilient flexible sheet material fastened to said wall adjacent said opening to cover said opening inside said container when unflexed and trigger means cooperating with said bait for holding said door in resiliently flexed open position, so that vermin entering said container and attacking said bait release said spring door sealing vermin within said container.

2. The combination according to claim 1 wherein said door is of spring metal, said door being fixed by its upper edge to said wall.

3. The combination according to claim 2 wherein said door has an upper edge bent forward forming an inward extension of said wall and wherein said trigger mechanism comprises link members extending between the bottom of said door and said upper edge of said door, said bait being disposed about and connecting said link members.

4. The combination according to claim 3 wherein said link members have mating zigzag portions held together by said bait.

5. In an animal trap for vermin according to claim 1, said trigger means comprising, in combination, link means extending to and holding said spring closed door, and said bait being formed about and joining said link means so that said bait, on being devoured, opens said link means and thereby releases said spring closed door.

6. The combination according to claim 5 wherein said bait comprises cement bonded food particles.

7. The combination according to claim 6 wherein said cement is a vinyl acetate cement.

* * * * *